W. L. BLOWS.
FEED HOPPER.
APPLICATION FILED MAR. 6, 1918.
1,274,375.
Patented Aug. 6, 1918.
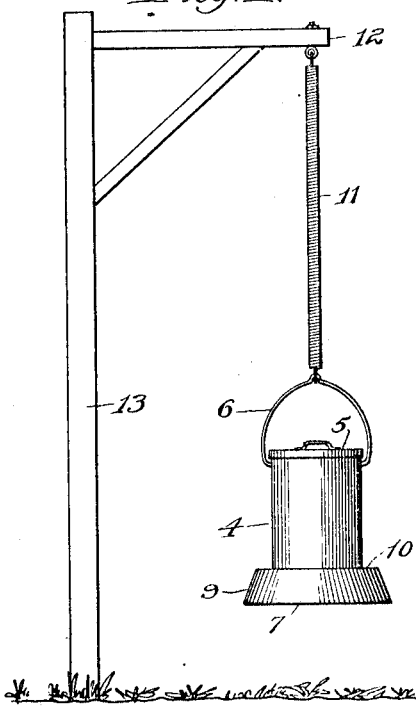
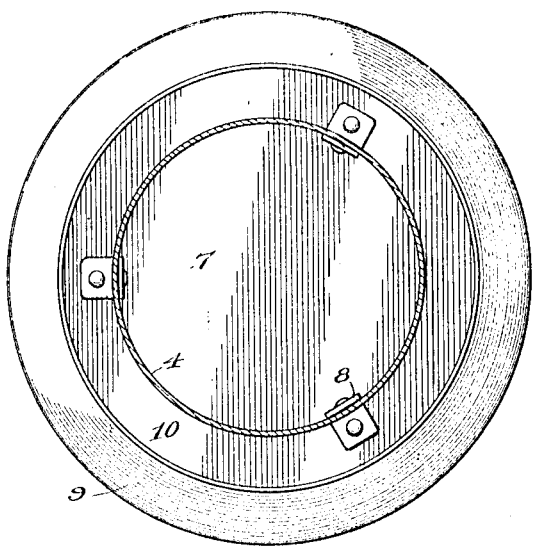
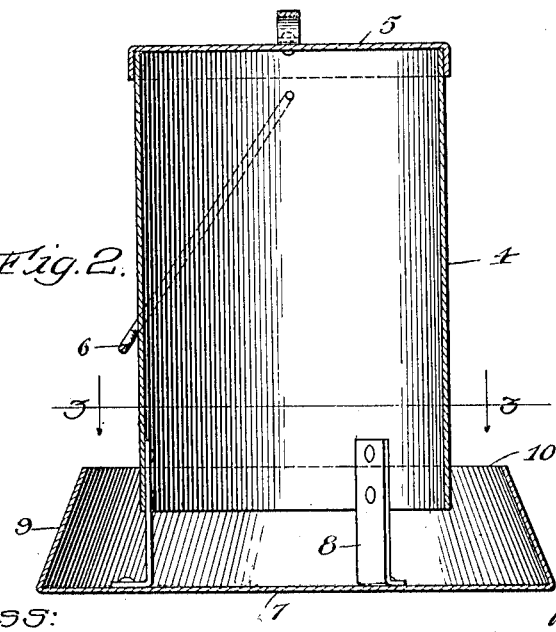
Inventor,
Wilbur L. Blows.
By Glenn S. Noble, Atty.
Witness:
R. L. Farrington

UNITED STATES PATENT OFFICE.

WILBUR L. BLOWS, OF WAUKEGAN, ILLINOIS.

FEED-HOPPER.

1,274,375.  Specification of Letters Patent.  Patented Aug. 6, 1918.

Application filed March 6, 1918. Serial No. 220,703.

*To all whom it may concern:*

Be it known that I, WILBUR L. BLOWS, a citizen of the United States, residing at Waukegan, in the county of Lake and State of Illinois, have invented certain new and useful Improvements in Feed-Hoppers, of which the following is a specification.

This invention relates more particularly to a feed hopper or device for feeding poultry. The objects of this invention are to provide a new and improved form of feed hopper particularly adapted for feeding dry mash or other feed; to provide a hopper so constructed that a constant supply of fresh clean feed may be kept in accessible position for the poultry; to provide a hopper in which the feed can be automatically fed from a supply reservoir to a feeding trough or pan; and in general to provide such an improved apparatus as will appear more fully from the following description.

In the accompanying drawings illustrating this invention:

Figure 1 is a side view showing the hopper in suspended position;

Fig. 2 is a longitudinal sectional view; and,

Fig. 3 is a sectional view taken on the line 3—3 of Fig. 2.

As illustrated in these drawings, 4 indicates a feed receptacle or container having a cover 5 and a bail or handle 6. A pan 7 is attached to the lower portion of the receptacle 4 in any suitable manner as by means of legs or brackets 8. The sides 9 of the pan slope inwardly so that the opening 10 is considerably smaller in diameter than the bottom of the pan. This opening is sufficiently larger than the outer diameter of the receptacle 4 so as to provide an annular feeding area through which the fowls may reach the feed. It should also be noted that the bottom of the receptacle or container 4 extends down into the pan a sufficient distance so that the feed will not spill out over the top of the pan, although a sufficient amount will be presented at the feeding area, as long as a sufficient supply remains in the receptacle.

The feed hopper is preferably supported by means of a coiled suspension spring 11 or other equivalent yielding device. In the present instance, this spring is shown attached to an arm 12 from a post 13, but it is apparent that it may be attached to any support and ordinarily can be secured to the roof or some other suitable part of the chicken house.

By means of this arrangement, it will be seen that I provide a simple and efficient feed hopper which is inaccessible to rats or mice, and yet easily accessible to the poultry, and by its use a constant supply of fresh clean feed may be kept before the poultry. On account of the hopper being suspended by the spring 11, it will be constantly agitated as the fowls pick the feed from the trough, and clogging or packing of the feed is prevented. Furthermore, it will be noted that the poultry cannot perch on the hopper or scratch the mash or feed out of it. It will be particularly noted that the slanting side or edge of the pan also prevents poultry from throwing out the feed. The device being simple in construction may be readily cleaned and may also be economically manufactured.

It will be noted that changes may be made in details of construction without departing from the essential features of my invention, and therefore I do not wish to be limited to the exact construction herein shown and described, except as specified in the following claims in which I claim:

1. In a device of the character set forth, the combination of a receptacle having an open bottom, a pan secured to said bottom and having upwardly and inwardly sloping sides extending above the bottom of the receptacle and terminating adjacent to the sides of the receptacle to form a narrow feed opening, and means for resiliently supporting said receptacle whereby the elastic action of the support will help to cause the feed to flow into the feed opening as fast as consumed and will also tend to prevent the fowls from roosting on the device.

2. In a device of the character set forth, the combination of a receptacle having an open bottom, a pan secured to said bottom, and having upwardly and inwardly sloping sides extending above the bottom of the receptacle and terminating adjacent to the sides of the receptacle to form a narrow feed opening, a cover for said receptacle, a bail for supporting said receptacle, and a suspension spring connected with said bail and adapted to hold the device in raised position.

WILBUR L. BLOWS.

Copies of this patent may be obtained for five cents each, by addressing the "Commissioner of Patents, Washington, D. C."